United States Patent [19]
Slayton

[11] 4,406,460
[45] Sep. 27, 1983

[54] ANTI-WEEPAGE VALVE FOR ROTATING SEALS

[75] Inventor: Richard M. Slayton, South Windsor, Conn.

[73] Assignee: United Technologies Corporation, Hartford, Conn.

[21] Appl. No.: 438,146

[22] Filed: Nov. 1, 1982

[51] Int. Cl.³ .......................... F16J 15/16; F16J 15/42
[52] U.S. Cl. .......................................... 277/25; 277/75
[58] Field of Search ................... 277/25, 27, 75, 96.1, 277/86, 76

[56] References Cited

U.S. PATENT DOCUMENTS

| | | | |
|---|---|---|---|
| 2,352,336 | 6/1944 | Martin et al. | 277/25 |
| 2,898,132 | 8/1959 | Guerin | 277/25 |
| 3,062,554 | 11/1962 | McGahan et al. | 277/25 |
| 3,160,416 | 12/1964 | Ryffel | 277/25 |
| 3,572,727 | 3/1971 | Greiner | 277/75 |
| 3,905,605 | 9/1975 | Hübner | 277/75 |
| 4,196,911 | 4/1980 | Matsushita | 277/75 |

Primary Examiner—Robert I. Smith
Attorney, Agent, or Firm—Norman Friedland

[57] ABSTRACT

For a rotating carbon seal that requires lubrication a rotating self-actuating weepage valve responding to speed and/or pressure for closure of the valve at a given operating condition.

6 Claims, 4 Drawing Figures

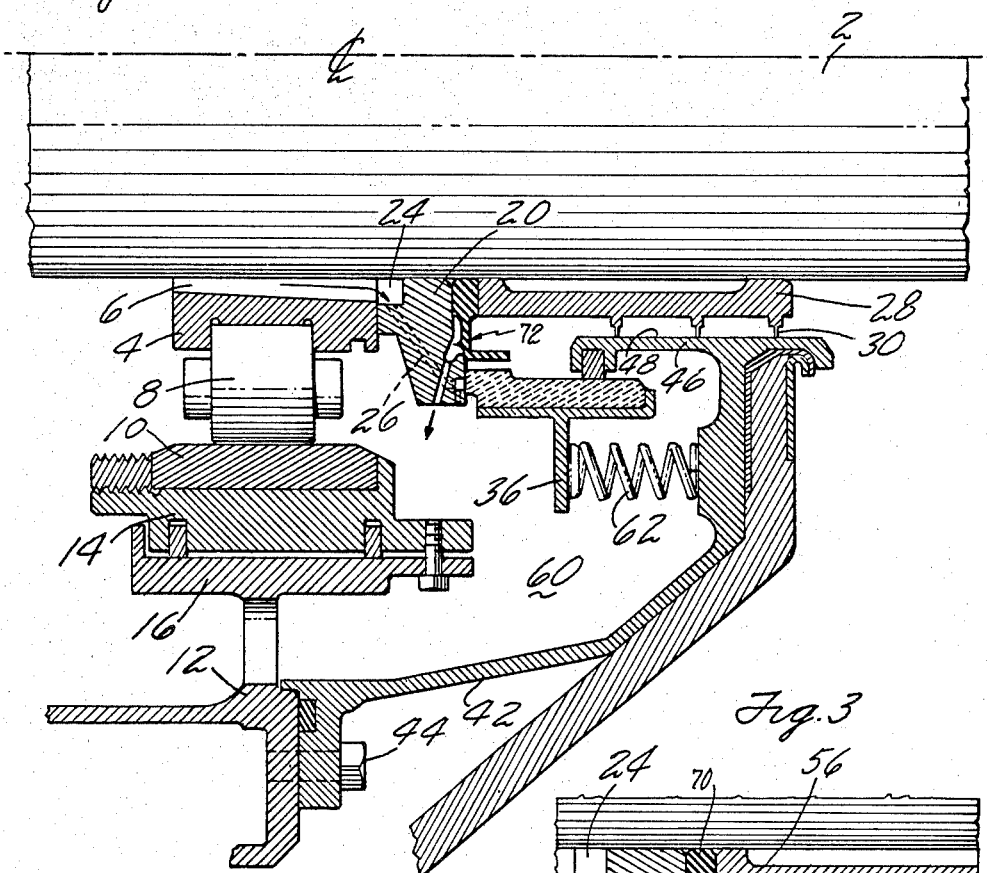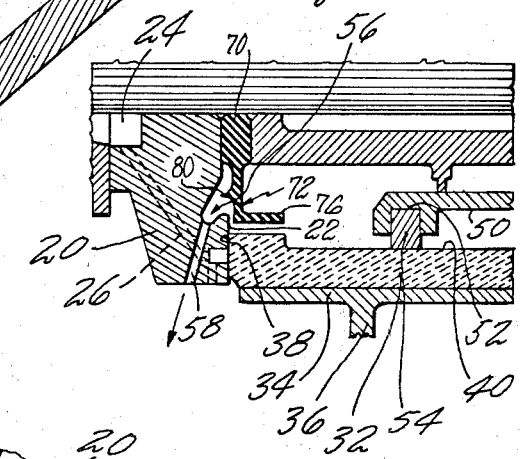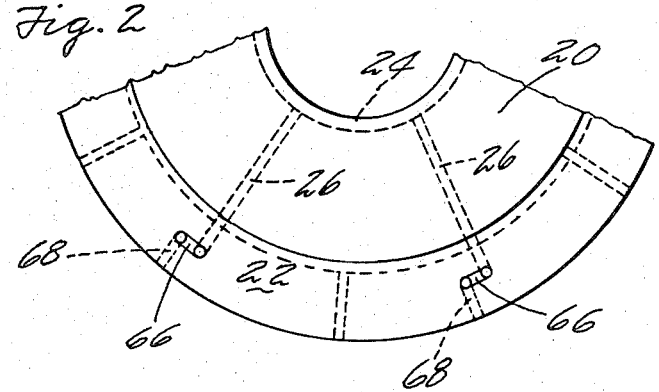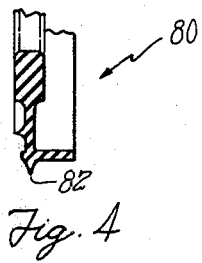

ANTI-WEEPAGE VALVE FOR ROTATING SEALS

CROSS-REFERENCE

This invention constitutes an improvement over the system described in U.S. Patent Application Ser. No. 390,002 filed on June 18, 1982 by Joseph Davis and Donald D. Sidat and assigned to the same assignee as this application.

DESCRIPTION

2. Technical Field

In a carbon seal construction, the oil that weeps or escapes radially inward from the lubricated seal/plate interface is trapped between the valve and rotating seal plate and is forced back by centrifugal force to the bearing compartment surrounding the seal, and eliminates weepage occurring during the low rotational speeds and/or low pressure drop by incorporating a normally opened rotating valve that closes as a function of speed and/or pressure conditions.

2. Background Art

In a gas turbine engine the bearing compartment surrounding the bearing is sealed around the shaft by various types of seals, one of which is a wet face carbon seal in which a ring or carbon seal plate mounted on the shaft and rotating with it has a radial face engaging a fixed carbon seal element that is held axially against the ring by springs and air pressure. The cooperating faces on the ring and carbon seal are lubricated to minimize friction and wear.

Some of the oil that is used for wetting the face of the carbon seal weeps out from the cooperating sealing faces into the space between the seal and the shaft on which the seal is mounted. This oil must be removed and various techniques are used for its removal. It would be desirable to have the oil flow directly from the space into the bearing compartment surrounding the seal since oil is scavenged from this compartment. It is also desirable that the flow from the space into the bearing compartment occur without leaking hot, high pressure air into the bearing compartment.

DISCLOSURE OF INVENTION

A feature of the invention is the use of a valve responsive to speed and/or pressure for communicating weepage oil to an annular groove and oil passages located in the seal plate into the bearing compartment.

Another feature is the configuration of the valve element to create a deflection means for the effective removal of the oil.

According to the invention, the seal plate which is normally on the shaft, and rotates with it, and which has oil supply passages therein for supplying oil to the mating faces on the seal ring and the mating cooperating fixed seal element, also has other passages therein extending from a groove in the face of the seal plate positioned radially inward from the fixed carbon of the face through the sealing plate to the outer periphery of the seal plate. As the engine operates, the rotation of the seal plate creates a centrifugal force on oil entering these passages to pump the oil outwardly into the bearing compartment that surrounds the seal. The seal plate annular groove at the inner edge of the sealing surface in which the oil collects and with which the escape passages communicate and a flexible rotating valve normally open to allow the escapement of weepage fluid closing at a predetermined speed and/or pressure or combination thereof.

The foregoing and other objects, features and advantages of the present invention will become more apparent in the light of the following detailed description of preferred embodiments thereof as shown in the accompanying drawing.

BRIEF DESCRIPTION OF THE DRAWINGS

FIG. 1 is a sectional view through a bearing and seal assembly showing the invention with the valve closed.

FIG. 2 is a plan view of a portion of the seal plate showing the oil passages therein.

FIG. 3 is an enlarged view of a detail with the valve opened.

FIG. 4 is a sectional partial view of an alternative valve element.

BEST MODE FOR CARRYING OUT THE INVENTION

The invention is shown as applied to a gas turbine engine in which there is a shaft 2 connecting the compressor blading and the turbine blading. Mounted on the shaft is an inner bearing race 4 having a plurality of axial grooves 6 therein for delivering oil to the seal plate. Bearing elements 8 are positioned between the inner race 4 and an outer race 10 and the outer race is supported from a bearing support 12 through a damping ring 14 located between the outer race 10 and a cylindrical portion 16 as a support.

Also mounted on the shaft at the end of the inner race is a seal plate 20 that has a radial sealing face 22 near its periphery. A notch 24 in the bore of the plate is located at the end of the grooves 6 to receive and transmit lubricant from these grooves to the seal plate oil passages 26 therein extending through the seal plate from the notch 24 to the sealing face 22. These passages have a radial component so that centrifugal force, as the engine operates, pumps oil from the notch to and against the sealing face for lubricating it.

The seal ring is clamped on the shaft between the inner race 4 and a sleeve 28 which has sealing fins 30 on its outer periphery. Suitable means, not shown, hold these three elements securely on the shaft so that they are in fixed position axially on the shaft and rotate with it.

Cooperating with the seal plate 20 is an annular carbon seal element 32 carried in a sleeve 34 having a flange 36 thereon and having a radial sealing face 38 cooperating with the seal plate face 22. This element has a cylindrical inner surface 40 the diameter of which is preferably about the same diameter as the mid-portion of the sealing face 38.

The seal element 32 is supported in position around the shaft by a support housing 42 secured as by bolts 44 to the bearing support 12 and having a cylindrical portion 46, the inner surface 48 of which is closely spaced relative to the sealing fins 30 and the outer surface 50 of which has a groove 52 to receive a piston ring 54 in engagement with the surface 40 of the carbon seal element. In this way, the axial movement of the carbon seal element is permitted so that the sealing faces may be held in contact with each other with the assistance of axial springs 62.

The seal plate 20 and the rotating valve are so shaped at the inner edges of the cooperating sealing surfaces as to form an annular groove 56 at this location to receive any leakage of oil from between the mating surfaces.

The seal plate also has several oblique passages 58 therein extending from the base at the groove to the outer periphery of the seal ring thus communicating with the bearing compartment 60 surrounding the seal. This compartment is scavenged during engine operation to remove any oil collecting therein. The annular groove 56 in the seal plate is so located that a centrifugal pumping head can be developed to return oil to the bearing compartment.

In operation high pressure sealing air is supplied to the right of the seal fins 30 and this high pressure air works past these fins into the space between the carbon seal element and the sleeve 28 and this pressure plus springs holds the carbon seal element against the seal plate to keep the sealing faces in contact.

Oil is also supplied to the end of the groove 6 and is forced along the grooves by centrifugal force since the outer surfaces of the grooves slant away from the axis of the shaft in a direction of the seal ring. Thus oil entering the groove 6 is carried by centrifugal force to and through the passages 26 and lubricates the mating sealing surfaces. Oil weeping from the mating surfaces into the annular groove 56 is pumped out by centrifugal force acting in the passage 58 and discharged into the bearing compartment. It will be understood that this action is possible even though there is pressure in the bearing compartment. This pressure is not routinely as high as that supplied to the seal fins. The passages 58 are obviously circumferentially spaced from the passages 26 as shown in FIG. 2 so they do not intersect passages 26.

The oil in the passages 26 is used to cool the seal plate as well as to lubricate the seal faces. To accomplish this, an adequate flow of oil must be provided. The ends of the passages 26 at the seal face terminate in short circumferential grooves 66. These grooves in turn communicate with radial passages 68 leading into the bearing compartment. In this way there is a continuous flow of oil through passages, grooves 66 and passages 68 for cooling purposes, the oil in the grooves 66 serving to lubricate the seal surfaces.

According to this invention, the end portion 70 on the inner diameter of annularly shaped valve element 72 is sandwiched between the ends of sleeve 28 and seal plate 20 and extends radially outward to overlie the annular groove 56 and seal against a portion of face 38. When either the pressure drop across valve element is sufficient and/or the speed of the rotating valve element 72 aided by the centrifugal force contributed by axially extending mass 76 the valve element 72 is urged closed.

The pointed projection 80 on the annular side of element 72 extending axially inwardly into annular groove 56 serves to divert the oil into annular groove 56. The air flowing through the opened valve element 72 assists the oil to find its way into annular groove 56.

From the foregoing, it is apparent that the holes 58 in seal plate 20 will act as a pump to maintain airflow through the opening of valve element 72 down to zero or slightly negative pressure drops. When the rotational speed is sufficiently high and the pressure drop across the seal is sufficient to prevent oil weepage, valve 72 will close thus preventing high air leakage through holes 58 into the bearing compartment 60. By selecting the opening gap formed by valve element 72, the number and size of holes 58 and the size of the overlying mass portion 76, valve 72 can be designed to close at predetermined conditions of speed and pressure drop.

The valve element 80 in FIG. 4 exemplifies another embodiment where the depending knife edge lip 82 extending radially downward to engage the top inner diameter of the carbon seal 32.

This invention is designed to replace the heretofore existing anti-weepage grooves in wet face seal plates which are relatively ineffective in preventing oil weepage and have compromised the design and function of the wet face seal resulting in:

(1) Hot gas leakage through weepage slot, at high pressure drops, causes coking of wet face slots.
(2) "Heat Checking" of seal plate due to high temperature operation.
(3) Seal air leakage increased.
(4) Increased oil flow requirements.

While this valve is designed to use with wet face seals, it can be used with dry face seals if weepage problems occur.

It should be understood that the invention is not limited to the particular embodiments shown and described herein, but that various changes and modifications may be made without departing from the spirit and scope of this novel concept as defined by the following claims.

I claim:

1. For a rotating seal including a rotating shaft, a circular shaped seal element fixedly secured to said shaft for being rotated therewith having a radial face, a stationary fixed element having a complimentary radial face being in engagement therewith, an oil passage for leading lubricating oil to said face, a self-actuating valve element extending radially from said shaft to overlie a portion of said radial face on said rotating seal element and overlie an annular groove formed in said radial face of said rotating seal element and being normally spaced therefrom, and means on said self-actuating valve element to position said valve element to bear against said radial face of said rotating seal element upon reaching a predetermined rotational speed.

2. For a rotating seal as in claim 1 wherein said rotating valve element responds solely to pressure.

3. For a rotating seal as in claim 1 wherein said rotating valve element responds to both rotational speed and pressure.

4. For a rotating seal as in claim 1 including a lip extending axially from said valve element into said groove for deflecting oil passing through the gap formed by said valve element and the radial face of said rotating seal element when in the opened position.

5. For a rotating seal as in claim 4 including a flange-like element extending axially from said rotating valve element to add mass to said rotating valve element for imparting closure motion to said rotating valve element responsive to centrifugal loads imposed by said mass when rotating.

6. A rotating seal as in claim 5 wherein said rotating valve element is radially spaced from said stationary fixed element and a projecting lip extending radially from said rotating valve element and terminating in close proximity with the inner diameter of said stationary fixed element.

* * * * *